United States Patent [19]

Emmons

[11] Patent Number: 4,969,303

[45] Date of Patent: Nov. 13, 1990

[54] BELT WEATHERSTRIP WITH SPIRAL RETENTION LOCK

[75] Inventor: Ronnie Emmons, Lexington, Ky.

[73] Assignee: The Standard Products Company, Cleveland, Ohio

[21] Appl. No.: 315,476

[22] Filed: Feb. 24, 1989

[51] Int. Cl.$^5$ .............................................. B60R 13/06
[52] U.S. Cl. .................................. 52/717.1; 49/462; 49/492
[58] Field of Search ............... 49/462, 490, 491, 500, 49/499, 498, 497, 496, 495, 494, 493, 377; 52/716, 717, 718, 400; 24/292, 293, 294, 295

[56] References Cited

U.S. PATENT DOCUMENTS

| | | | |
|---|---|---|---|
| 3,363,364 | 1/1968 | Cadiou . | |
| 3,399,448 | 9/1968 | Jackson | 52/716 |
| 3,401,486 | 9/1968 | Adell | 49/462 |
| 3,448,550 | 6/1969 | Herr | 52/717.1 |
| 3,934,385 | 1/1976 | Paulus | 52/717.1 |
| 4,499,689 | 2/1985 | Adell | 49/462 |
| 4,696,128 | 9/1987 | Fukuhara . | |
| 4,769,966 | 9/1988 | Petri | 52/716 |

FOREIGN PATENT DOCUMENTS 295989  5/1988  France .

Primary Examiner—John E. Murtagh
Attorney, Agent, or Firm—Harness, Dickey & Pierce

[57] ABSTRACT

A molding for attachment to a vehicle having a flange edge, said molding comprising a generally U-shaped metallic support member having in cross-section, first and second legs joined together by a web and a spiraled section formed from a portion of one leg said support member, said spiraled section extending inwardly in a channel of said support member and in opposition to the other leg of said support member.

7 Claims, 4 Drawing Sheets

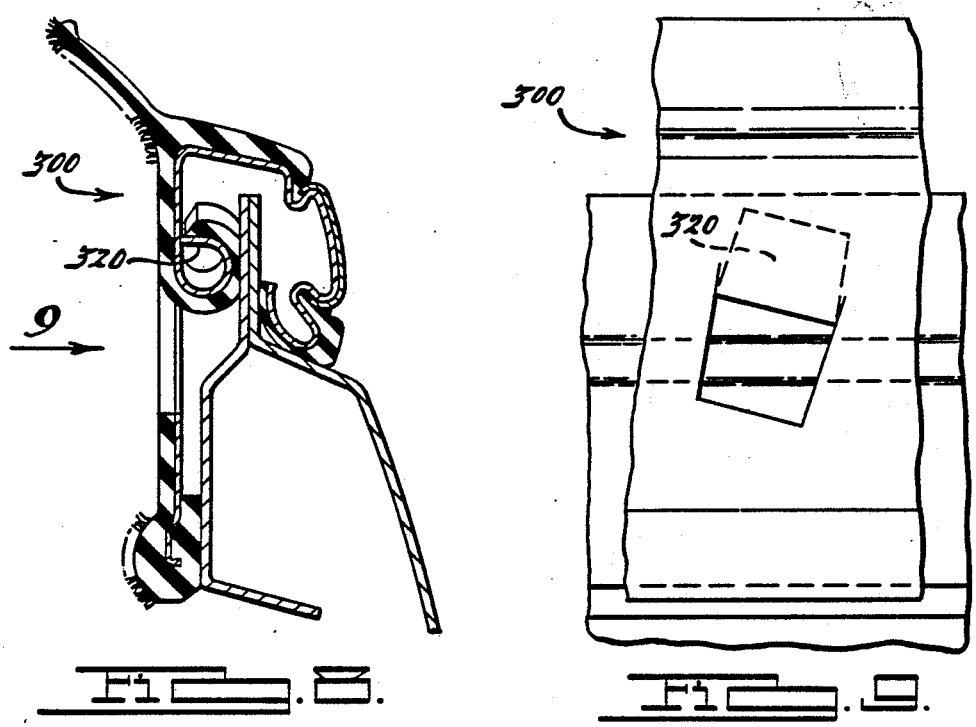
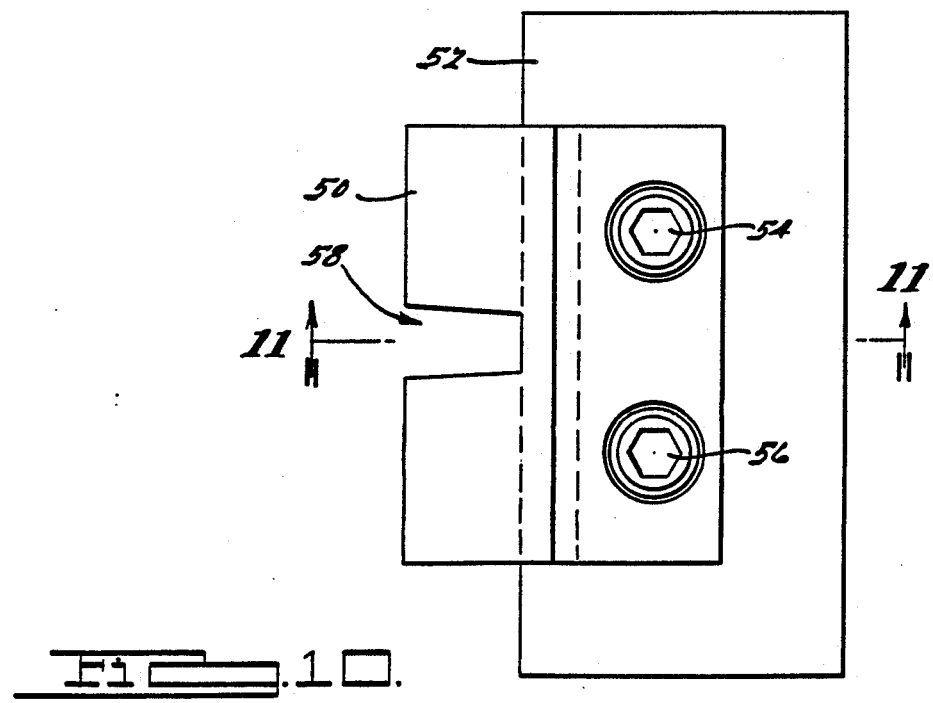

BELT WEATHERSTRIP WITH SPIRAL RETENTION LOCK

BACKGROUND OF THE INVENTION

The present invention relates to a molding for attachment to an automotive vehicle. More particularly, the present invention relates to a belt weatherstrip molding for an automotive vehicle.

Belt weatherstrip molding is employed along the lower edge of a window of a door of an automotive vehicle to seal out the weather environment and to improve the appearance of the vehicle. Belt weatherstrips are generally secured to an upper metal flange or edge of an outer door panel of the vehicle. Belt weatherstrips conventionally are retained on the associated door outer panel flange by means of metal clips which are manufactured separately from the belt weatherstrip of separate pieces of metal and then are attached to the belt weatherstrip in another manufacturing step. Use of separate clips thus involves a separate manufacturing step and introduces a quality control factor.

For ease of manufacture, it is desirable that belt weatherstrip be constructed so as to be easily installed along the supporting flange or edge. On the other hand, it is also desirable that, once installed, the belt weatherstrip is strongly secured to the flange. It is generally intended during the manufacture of the automotive vehicle that the weatherstrip generally be permanently installed along the flange or edge to which it is attached. As weatherstrips are conventionally inserted on the door flanges during manufacture of vehicles, it can be said with respect to most weatherstrips that it is desirable that the weatherstrips have low insertion values but high extraction values to meet automotive assembly specifications.

In accordance with the present invention a belt weatherstrip is provided to have a spiral lock feature which provides low insertion and high extraction characteristics, thus, the weatherstrip of the present invention can be easily installed along a flange or edge which is to be sealed and yet, once installed, the weatherstrip strongly resists extraction or removal from the flange. Furthermore, the spiral lock retention means for the belt weatherstrip is provided from the metal of the belt weatherstrip itself and no separate manufacturing step is required to attach a discrete clip to the belt weatherstrip. The retention means is manufactured and positioned on the belt weatherstrip in one step during the process of manufacturing the belt weatherstrip's central support member. A belt weatherstrip made in accordance with the present invention thus conserves both manufacturing steps and metal.

Further understanding of the present invention will be had from the following disclosure and claims taken in conjunction with the drawings.

SUMMARY OF THE INVENTION

Generally speaking, the present invention is a molding for attachment to a flange edge, such as a belt weatherstrip molding for attachment to a door outer panel flange, said molding comprising:

a generally U-shaped metallic support member having in cross-section, first and second legs joined together by a web; and a spiraled section formed from a portion of one leg of said support member, said spiraled section extending inwardly in a channel of said support member and in opposition to the other leg of said support member.

BRIEF DESCRIPTION OF THE DRAWINGS

FIG. 8 is a sectional view, similar to FIG. 6 but showing still another embodiment of the present invention.

FIG. 9 is an elevational view, broken away, of the embodiment of FIG. 8 as viewed in the direction indicated by arrow 9 in FIG. 8.

FIG. 10 is a plan view of a die block and retainer block suitable for spiral punching spiral sections of the present invention.

DESCRIPTION OF THE PREFERRED EMBODIMENT

Figure 1:
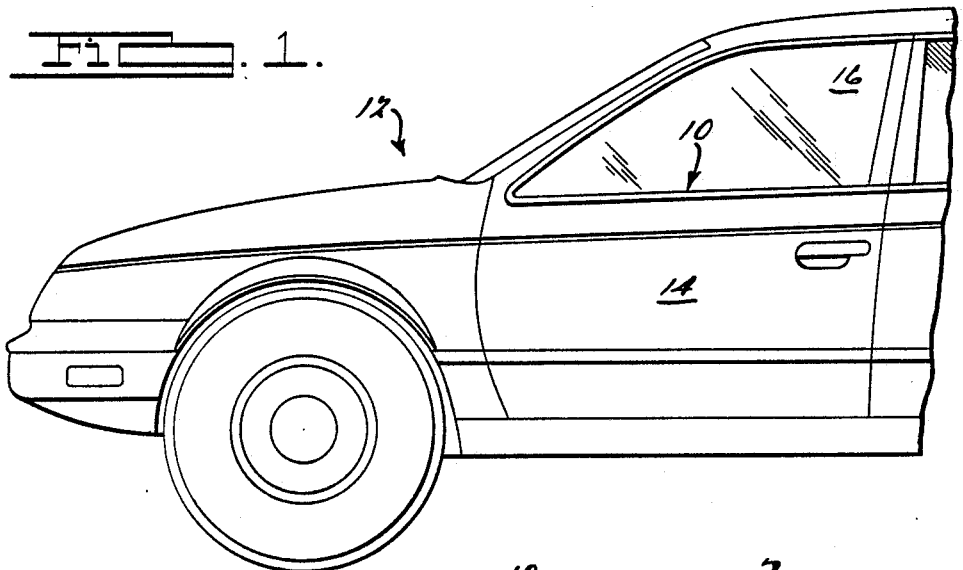
FIG. 1 is an elevational view, broken away, of an automotive vehicle having a molding of the present invention attached thereto.

A preferred embodiment of a belt weatherstrip of the present invention is indicated generally by numeral 10 and is illustrated installed on automotive vehicle 12 in FIG. 1. Molding 10 is a belt weatherstrip positioned on the upper flange of the outer panel of door 14 of automotive vehicle 12 along the bottom edge of window 16.

Figure 2:
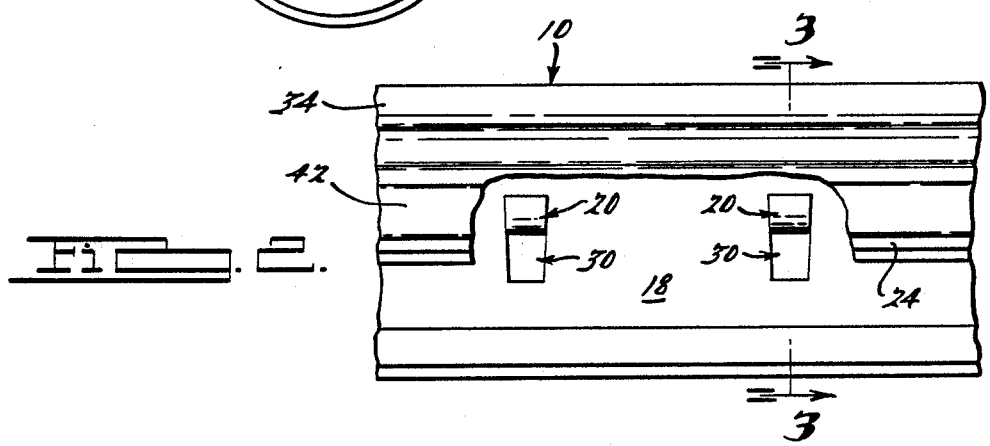
FIG. 2 is an elevational view of a preferred embodiment of the present invention with a portion broken away to show a preferred spiral lock of the present invention.
Figure 3:
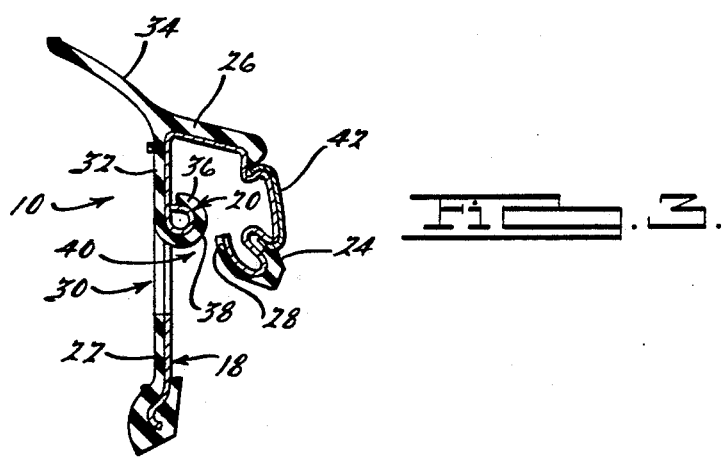
FIG. 3 is a sectional view taken along line 3—3 of FIG. 1.

As is best shown in FIGS. 2 and 3, molding 10 has, in cross-section, a generally U-shaped support member 18 with discrete spiral lock retention means sections 20.

Support member 18 is an elongated metal strip which has, in cross-section, a relatively longer leg 22 and a relatively shorter leg 24 joined by a web portion 26 to form a generally U-shaped structure. Leg 24 has a reentrantly bent free end 28. Die contour angle punched out of leg 22 are a plurality of spiraled sections 20 which are in opposition to reentrant end 28 of leg 24. Apertures 30 result from the removal of metal in the punching operation to provide spiral sections 20.

Support member 18 has an elastomeric cover 32 with window blade 34 extending therefrom in a conventional manner. Preferably, elastomeric cover 32 includes a portion 36 over spiral 20 a portion of which, indicated by numeral 38, faces in opposition to reentrant end 28. Portion 38 serves to prevent scratching of a flange inserted into channel 40 and improved retention of molding 10 thereon. Also preferably, elastomeric cover 32 has flocking or other low friction coating (not shown in the Figures) on its surface portions which will come into contact with the glass window 16. A bright strip or bead 42 of stainless steel is provided for decorative purposes along a portion of the outwardly facing side of support member 18 of molding 10.

Figure 11:
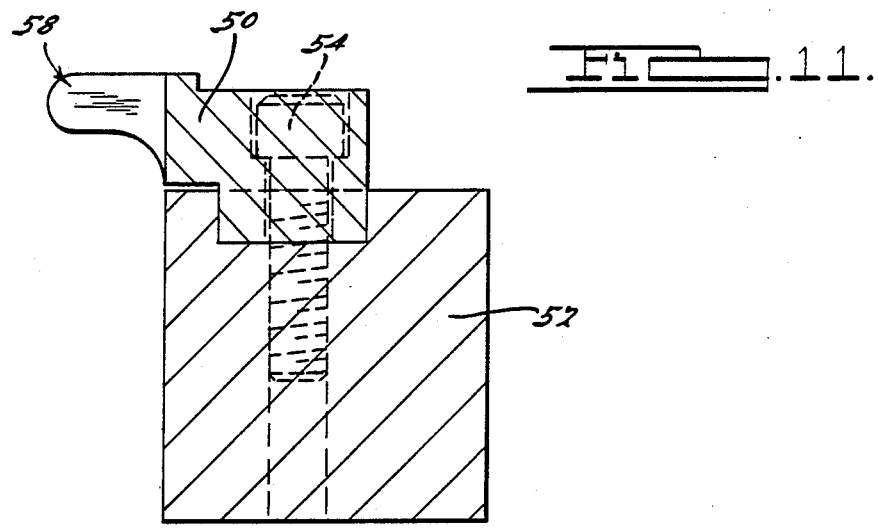
FIG. 11 is a sectional view taken along line 11—11 in FIG. 10.
Figure 12:
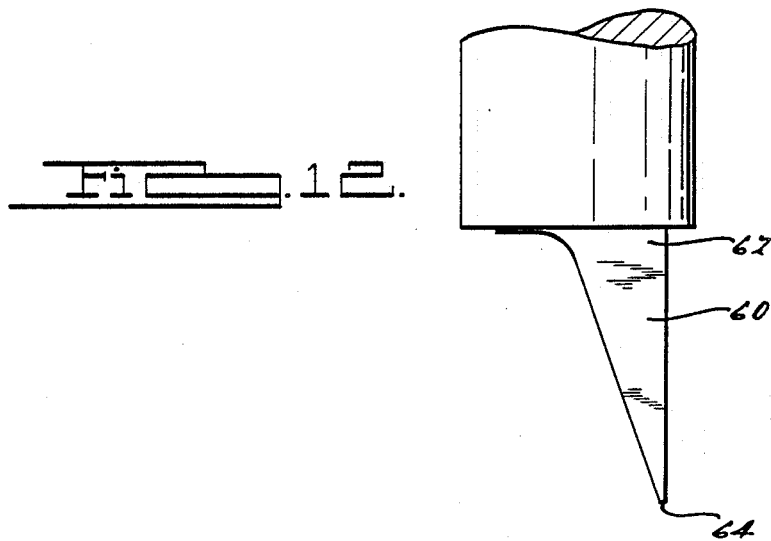
FIG. 12 is an elevational view, broken away, of a punch for use with the die block of FIG. 11.
Figure 13:
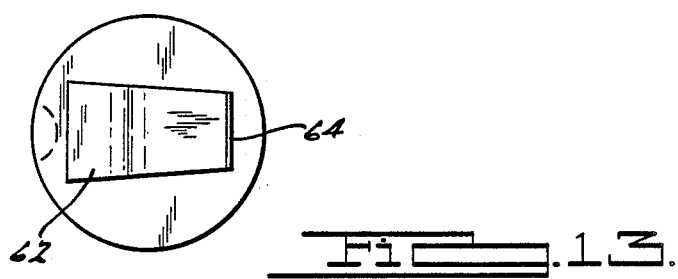
FIG. 13 is a bottom view of the punch of FIG. 12.

In the manufacture of molding 10, first a metal strip of aluminum, steel or other suitable metal is provided. The metal strip is roll formed into the generally U-shaped configuration of support member 18. Stainless steel bead 42 is snapped onto member 18 and then elastomeric cover 32 is extruded onto metal support member 18 and bonded thereto in a conventional manner. Alternatively, stainless steel bead 42 can be snapped onto member 18 after elastomeric cover 32 has been extruded and bonded thereto. Suitable elastomeric covers can comprise polyvinyl chloride or other rubber material adhesively secured to the metal carrier as is conventional in the molding art. Next flock or other low friction coating is applied and cured. The manufacture is cut to desired length and then the covered metal strip is developed spiral punched to provide the spiral sections 20. This can be done by use of a conventional punch-press with a die of a suitable shape as is illustrated in FIGS. 10-13. FIGS. 10 and 11 illustrate a suitable die block 50 attached to retainer block 52 in a conventional manner by threaded elements 54 and 56. Die block 50 has notch 58 for receiving a developed punch 60 as illustrated in FIGS. 12 and 13. Punch 60 is tapered, being wider at top portion 62 than at tip 64 to provide a developed spiral in operation. Advantageously, the provision of spiral 20 in this manner provides an inwardly facing spiral section which well serves to retain molding 10 onto a flange. In this manner use of a separate clips for retention is avoided as the spiral section 20 is provided from the metal material of the support carrier 18 itself. This provides an efficient and quick manufacturing process. The number and size of spiral sections 20 can be selected to provide the desired insertion and extraction values for automotive assembly specifications. The spiral sections trap the door sheet metal pinch-weld flange between themselves, or the elastomeric cover over themselves, and the relatively shorter leg 24 of the metal support member 18 or its reentrantly bent free end 28.

Figure 4:
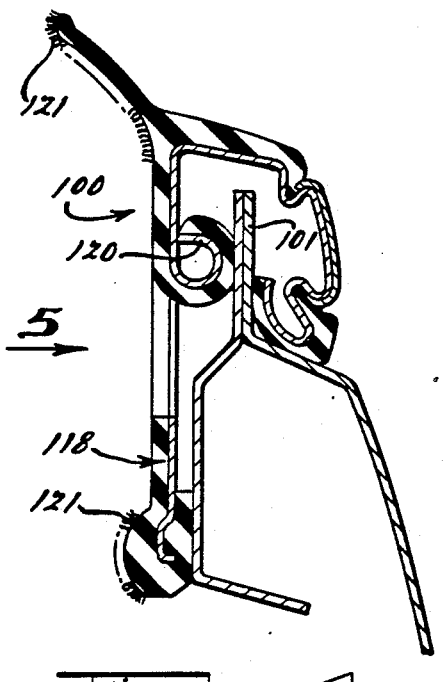
FIG. 4 is a sectional view similar to FIG. 3 but showing an alternative preferred embodiment installed on a vehicle door flange.
Figure 5:
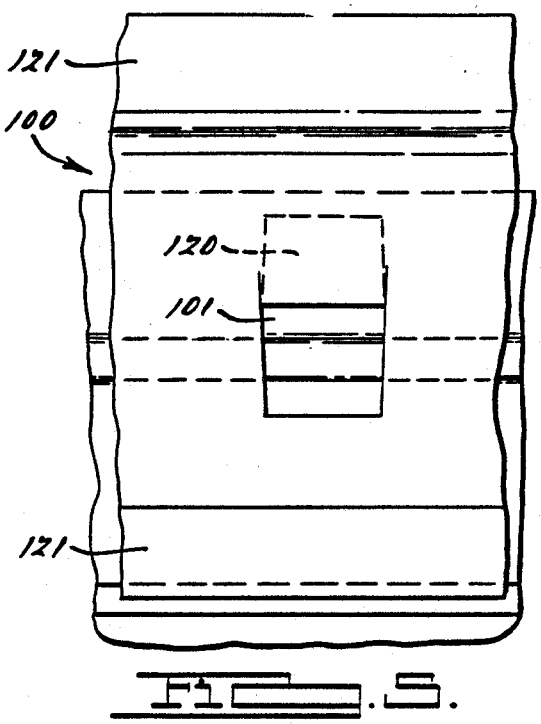
FIG. 5 is an elevational view, broken away, of the embodiment of FIG. 4 as viewed in the direction indicated by arrow 5 in FIG. 4.

An alternative preferred embodiment of the present invention is shown in FIGS. 4 and 5 and indicated generally by the numeral 100. Molding 100 is a belt weatherstrip shown mounted on upper flange 101 of an outer door panel of an automotive vehicle. Molding 100 has, in cross-section, a generally U-shaped support member 118 with a plurality of spiraled sections 120 thereon.

Molding 100 is analogous to molding 10 but has spiraled sections 120 which are wider than the spiraled sections 20 of molding 10. Also, molding 100 illustrates a molding having conventional flocking thereon as indicated at 121. Flocking is provided as a low friction coating facilitating the upward and downward movement of an associated window.

Figure 6:
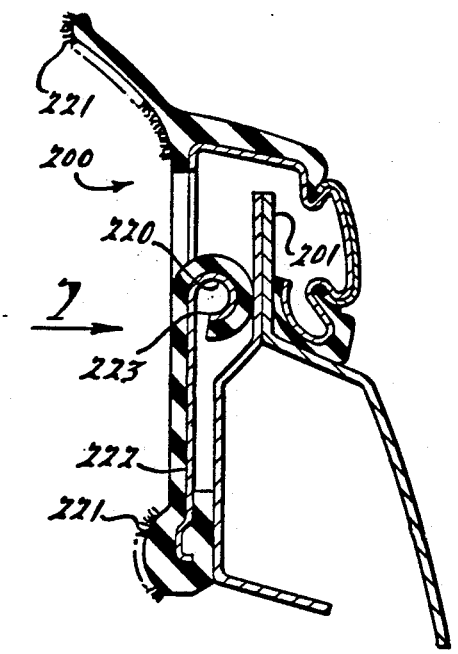
FIG. 6 is a sectional view similar to FIG. 4 but showing yet another alternative embodiment of the present invention.
Figure 7:
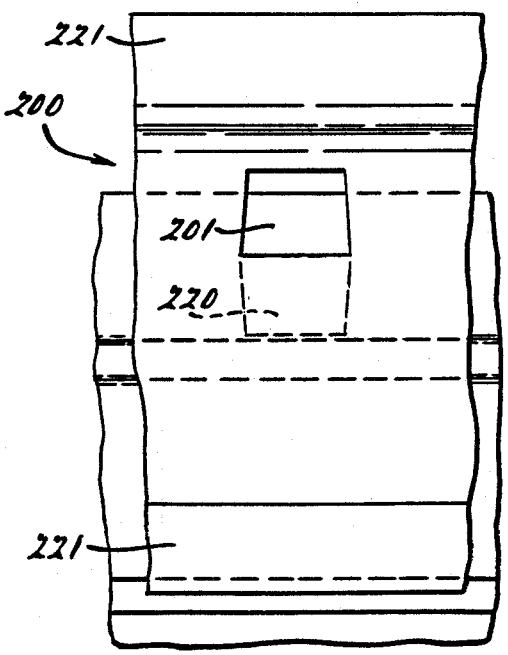
FIG. 7 is an elevational view, broken away, of the embodiment of FIG. 6 as viewed in the direction indicated by arrow 7 in FIG. 6.

Another alternative embodiment is shown in FIGS. 6 and 7 and indicated generally by the numeral 200. Molding 200 is generally analogous to molding 10 but spiral sections 220 are punched from leg 222 in a clockwise direction as viewed in FIG. 6 in contrast to the counterclockwise direction of spiral sections 20 of molding 10 as viewed in FIG. 3. Also, free end 223 of spiral 220 is spaced from associated leg 222 a slight distance. This provides somewhat more spring or "give" in spiral 220 when secured onto flange 201. Molding 200 also illustrates the use of flock 221 as a low friction coating to facilitate upward and downward window movement.

Still another alternative embodiment of the present invention is illustrated in FIGS. 8 and 9 and indicated generally by the numeral 300. Molding 300 is analogous to molding 10 but has spirals 320 punched out an oblique angle to the longitudinal axis of elongated molding 300.

The present invention has been described in an illustrative matter, and it is to be understood that the terminology which has been used is intended to be in the nature of words of description rather than of limitation. Many modifications and variations of the present invention are possible in light of the above teachings. It is therefore to be understood that within the scope of the appended claims the invention may be practiced otherwise than as specifically described above.

What is claimed is:

1. A molding for attachment to a vehicle having a flange edge, said molding comprising:
   a generally metallic support member having in cross-section, first and second legs joined together by a web to define a channel, said first leg being longer than said second leg, said second leg having a free end reentrantly bent inwardly with respect to said channel; and
   a spiraled section tapered in lateral cross-section and formed from a portion of one leg of said support member, said spiraled section extending inwardly said channel of said support member and in opposition to the other leg of said support member, said support member having an elastomeric cover over at least said spiraled section.

2. A molding as set forth in claim 1, wherein said spiraled section has a free end extending generally upwardly into said channel.

3. A molding as set forth in claim 2, wherein said spiraled section has a free end extending towards said opening of said channel.

4. A molding as in claim 3, wherein said spiraled section is at an oblique angle to said longitudinal axis of said molding.

5. A molding as in claim 4, wherein said spiraled section is unitary with said first leg.

6. A molding as in claim 5, wherein said spiraled section is punched from said first leg.

7. A molding as in claim 6, wherein said spiraled section comprises a portion of said first leg which has been spirally bent inwardly of said channel.

* * * * *